Patented Feb. 1, 1949

2,460,724

UNITED STATES PATENT OFFICE 2,460,724

RESINOUS REACTION PRODUCTS

Harry L. Allen, Philadelphia, Pa., and Earl G. Kerr, Haddonfield, N. J., assignors to Allied Chemical & Dye Corporation, New York, N. Y., a corporation of New York No Drawing. Application October 31, 1945, Serial No. 625,958

13 Claims. (Cl. 260—43)

This invention relates to a process of producing novel "two-stage" thermosetting resins.

It is an object of the invention to provide novel "two-stage" thermosetting resinous reaction products of coumarone, indene and their homologs with phenol and formaldehyde.

It is another object of the invention to provide a novel thermoplastic resin product which may be cured to insoluble, infusible state by heating in the presence of lime and hexamethylenetetramine. It is a further object of the invention to provide a process for the manufacture of such resins. Other objects and advantages will appear hereinafter.

The first-stage thermoplastic resins of the invention are made by reacting together one or more polymerizable materials of the group consisting of coumarone, indene and their homologs, phenol in amount at least equal to the weight of the polymerizable material, formaldehyde and an acid polymerization catalyst, preferably sulfuric acid. When the reaction is complete, the reaction mixture is distilled to recover as distillation residue the thermoplastic resinous reaction product of the polymerizable material, phenol and formaldehyde.

The resinous products of the first-stage of this invention may be compounded with hardening agents such as alkali and hexamethylenetetramine to produce "two-stage" resins and the resultant compounds are converted to insoluble, infusible masses when further compounded with fillers, lubricants, and dyes and subjected to heat and pressure. They are well adapted for molding and produce molded articles having an excellent, smooth molded surface and good mechanical and dielectric properties. The "two-stage" resins are also suitable thermosetting binders for use in the production of laminated products by impregnating and laminating sheets of fibrous material such as textile fabrics, paper, etc., and may be employed in the manufacture of tubing and coatings. In general, the time required for effecting cure of the resins at a given temperature depends on the relative proportions of coumarone-indene type polymerizable material present, i. e. the higher the ratio of coumarone-indene polymerizable material to phenolic material the longer the time required to cure the resin. Thus, by varying the proportions of phenolic material and polymerizable material, resins suitable for various purposes for which varying rates of cure are desirable may be readily obtained.

Oil fractions containing paracoumarone resin-forming polymerizable constituents such as are employed in the production of paracoumarone resin are preferably utilized as the source of polymerizable material in carrying out the invention. Such oils are formed in the distillation of coal and carburetion of water gas and are obtained during the coking of coal, distillation of coal tar and water gas tar, or may be collected in coal gas and water gas distribution systems. Solvent naphtha, coke oven light oil, drip oil, and water gas tar distillates are representative of such oils. Fractions of such oils boiling within the range of 150° to 210° C. may be employed. Such fractions contain a varying but substantial amount of indene, coumarone, or their homologs, and ordinarily contain mixtures of two or more of such compounds, the proportions of these polymerizable materials depending on the source of the oil and the boiling range of the fraction. For example, fractions of extracted carbolic oils boiling within the range of 150° to 210° C. ordinarily contain indene as the chief polymerizable constituent; fractions of light oil residues boiling within the range of 150° to 210° C. are rich in indene and contain less coumarone. Such oils, particularly drip oil fractions, may also contain other polymerizable materials such as methylstyrene in amount less than the coumarone-indene content of the fractions. Preferably, however, we employ a fraction or blend of oils containing indene and a smaller amount (by weight) of styrene than indene, for example, a drip oil fraction boiling within the range of 130° to 210° C., or a blend of the styrene fraction of drip oil boiling within the range of 130° to 160° C. with a sufficient amount of indene fraction of coal tar oil boiling within the range of 150° to 210° C. so that the blend contains a greater proportion of indene than styrene. Such styrene-containing fractions and blends produce more rapidly curing resins than styrene-free oils.

As the phenolic reagent, substantially pure phenol or blends of phenol with minor amounts of cresols and xylenols are employed. For example, blends of phenol with up to 40% by weight of meta-para cresol may be employed to obtain the thermoplastic resinous products of the invention. In order to obtain resins which are converted to insoluble, infusible products when mixed with alkali such as lime and hardening agents such as hexamethylene tetramine and subjected to the influence of heat, it is important that the reaction mixture contain an amount of phenol by weight at least equal to the amount of polymerizable material employed. Preferably, the weight ratio of phenol to polymerizable material falls within the range of 3:2 to 10:1.

In order to obtain thermoplastic resins, it is also important to carry out the reaction between the phenol, formaldehyde and polymerizable material in the presence of an acid catalyst. The preferred catalyst is sulfuric acid; phosphoric acid and hydrochloric acid may also be employed.

The formaldehyde may be employed in any desired form; preferably, commercially available aqueous formaldehyde solutions are utilized.

Gaseous anhydrous formaldehyde and paraformaldehyde are also suitable and are included within the scope of the term "formaldehyde" as used herein. The formaldehyde is employed in molar amount less than the combined molar amounts of phenol and polymerizable material. The amount of formaldehyde employed is ordinarily from 0.70 to 0.95, preferably from 0.80 to 0.90 mol for each mol of phenol and polymerizable material introduced into the reaction mixture.

The invention may be carried out by introducing the polymerizable material, phenol and formaldehyde into a reaction vessel, heating the reaction mixture to a temperature of at least 65° C., preferably 65°-90° C., and adding the catalyst to the heated mixture; addition of the catalyst after the other reactants have been heated above 85° C. produces more rapidly curable resin than is obtained when all of the constituents of the reaction mixture are mixed at room temperature, and is the preferred procedure. The reaction then proceeds under the influence of the liberated heat without further external heating, causing the temperature of the mixture to rise to within the range 95° to 100° C. The temperature is maintained within this range, while agitating the reaction mixture, until the reaction is complete. If the reaction tends to proceed too vigorously, the reaction mixture may be cooled to prevent the temperature from rising above 100° C. It is desirable to prevent the temperature from rising above 102° C., as higher temperatures promote excessive foaming of the reaction mixture and also deleteriously affect the properties of the resin. Maintenance of the temperature within the range of 95° to 100° C. for from 1 to 3 hours is ordinarily sufficient to complete the reaction. When the reaction is complete, the reaction mixture is distilled, preferably under vacuum, e. g. absolute pressure of 2" to 10" of mercury, to drive off the water, solvent and unreacted materials which may be present and thereby recover the thermoplastic resinous reaction product as residue.

The following examples are illustrative of the invention. In the examples parts are given by weight except where otherwise indicated:

*Example 1.*—80 parts of phenol, 75 parts of 37% aqueous formaldehyde solution, 38 parts of a coal tar oil fraction having a distillation range of 172° to 193° C. containing 53.3% by weight (20 parts) of polymerizable material, chiefly indene, and about 2.15 parts of sulfuric acid of 20% concentration were charged into a steam-jacketed reaction vessel equipped with agitator. The mol ratio of formaldehyde to the phenol and polymerizable material was about .91:1. Steam was passed through the jacket while agitating the contents of the vessel until the temperature of the reaction mixture rose to 90° C. and the passage of steam was then discontinued. The temperature of the reaction mixture rose under the influence of the heat liberated during the reaction to 96° C. and was maintained at about 96° C. for 2½ hours, at the end of which time the reaction was complete. The contents of the reaction vessel were agitated throughout the reaction. The reaction mixture was then subjected to distillation under absolute pressure of 3" of mercury and the distillation continued until the temperature of the resinous product reached 160° C. 102 parts by weight of resin of a melting point of 117° C. were obtained as residue. The resin had a color of C7, an acid number of 6.5, was insoluble in benzene and drying oils, and soluble in ethyl alcohol and in a mixture of equal parts by weight of ethyl alcohol and benzene.

*Example 2.*—70 parts of phenol, 75 parts of 37% aqueous formaldehyde solution, 57 parts of the coal tar oil fraction employed in Example 1 (containing 30 parts of polymerizable material, chiefly indene), and about 2.26 parts of sulfuric acid of 20% concentration were charged into a reaction vessel similar to that employed in Example 1. The mol ratio of formaldehyde to the phenol and polymerizable material was .93:1. The contents of the reaction vessel were heated to 90° C. by passing steam through the jacket while agitating, the passage of steam was then discontinued and the temperature of the reaction mixture rose to 96° C. under the influence of the heat liberated during the reaction and this temperature was maintained for about 3 hours, at the end of which time the reaction was substantially complete. The reaction mixture was distilled under absolute pressure of 3" of mercury until the temperature of the resin reached 148° C. 104.5 parts of resin of a melting point of 143° C. were obtained as residue. The resin had a color of C5, an acid number of 3.5, was insoluble in benzene and drying oils, and soluble in ethyl alcohol and a mixture of equal parts by weight of ethyl alcohol and benzene.

*Example 3.*—60 parts of phenol, 75 parts of 37% aqueous formaldehyde solution, 76 parts of the coal tar fraction employed in Example 1 (containing 40 parts of polymerizable material, chiefly indene), and 2.52 parts of sulfuric acid of 20% concentration were charged into a reaction vessel similar to that employed in Example 1. The mol ratio of formaldehyde to the phenol and polymerizable material was .95:1. The contents of the reaction vessel were heated to 90° C. by passage of steam through the jacket of the vessel and the passage of steam was then discontinued. The temperature of the reaction mixture rose under the influence of heat liberated during the reaction to 96° C. after the passage of steam was discontinued and was maintained at about 96° C. for 2¾ hours, at the end of which time the reaction was substantially complete. The reaction mixture was then subjected to distillation under absolute pressure of 3" of mercury and the distillation was continued until the temperature of the resin reached 140° C. 106.5 parts by weight of resin of a melting point of 136° C. were obtained as residue. The resin had a color of C5, an acid number of 3, was insoluble in benzene and drying oils, and soluble in ethyl alcohol and a mixture of equal parts by weight of ethyl alcohol and benzene.

The thermoplastic resins of Examples 1, 2 and 3 were compounded in accordance with the following formulae, parts being given by weight:

|  | Compound 1 | Compound 2 | Compound 3 | Compound 4 |
|---|---|---|---|---|
| Resin of Example 1 | 44.25 | 37.17 |  |  |
| Resin of Example 2 |  |  | 43.87 | 36.85 |
| Hexamethylene tetramine | 4.45 | 3.72 | 4.82 | 4.05 |
| Wood flour | 44 | 53 | 44 | 53 |
| Diatomaceous earth | 3 | 2 | 3 | 2 |
| Dye | 2 | 2 | 2 | 2 |
| Montan wax | 0.75 | 0.66 | 0.79 | 0.66 |
| Lubricant | 1 | 1 | 1 | 1 |
| Lime | 0.55 | 0.45 | 0.52 | 0.44 |

|                      | Compound 5 | Compound 6 |
|----------------------|------------|------------|
| Resin of Example 3   | 43.50      | 36.54      |
| Hexamethylene tetramine | 5.20   | 4.36       |
| Wood flour           | 44         | 53         |
| Diatomaceous earth   | 3          | 2          |
| Dye                  | 2          | 2          |
| Montan wax           | 0.78       | 0.66       |
| Lubricant            | 1          | 1          |
| Lime                 | 0.52       | 0.44       |

The diatomaceous earth was a filler sold under the trade-name "Celite." The lubricant was calcium stearate.

The ingredients of the above compounds were assembled, milled on differential rolls at mill-roll temperatures between 230° and 300° F. until the ingredients were thoroughly mixed. The compounds were then sheeted and ground to fine molding powders. The molding powders had apparent densities ranging from about .45 for compound 6 to .55 for compound 1. The molding powders were placed in molds and cured at 170° C. under pressure of 4500 pounds per square inch. The time required to cure discs ⅛" thick and 4" in diameter varied from about 2 to 3¼ minutes. The time required to effect cure may be reduced by preheating the molded compounds, e. g. to a temperature of 125° C. for 30 minutes.

The molded products had an excellent, smooth molded surface. Their specific gravity was from 1.33 to 1.44 (A. S. T. M. method D571-27). The molded products were subjected to water absorption, acetone extraction, shrinkage, heat distortion, hot oil and oven bake tests, and were also tested for flexural strength, impact strength, tensile strength, compressive strength, and dielectric strength by the customary methods applied to phenol-formaldehyde resins. The results of the tests indicate that the products may be satisfactorily employed for the general purposes for which phenol-formaldehyde thermosetting resins are utilized.

*Examples 4 and 5.*—Two reaction mixtures were made up as follows:

|                      | Example 4 | Example 5 |
|----------------------|-----------|-----------|
| Phenol               | 240       | 180       |
| Coal tar fraction    | 100       | 200       |
| 37% formaldehyde     | 207       | 155       |
| Sulfuric acid (66° Bé) | 3.7     | 3.7       |

The coal tar fraction was an oil distillate boiling within the range of 169.5° to 196° C. and contained about 60% by weight of polymerizable material, chiefly indene and coumarone. The reactants were heated together in reaction vessels until the mixtures reached a temperature of 70° C., after which the temperature rose to 96° C. under the influence of the heat liberated during the reaction and was maintained at this point for 1 hour while agitating the contents of the vessels. The two reaction mixtures were then vacuum distilled under absolute pressure of 5" of mercury for 2 and 1½ hours, respectively. 324 parts of resin of a melting point of 138° C. were recovered in Example 4 and 311 parts of resin of a melting point of 125° C. were recovered in Example 5.

The resins of Examples 4 and 5 were subjected to curing tests on a hot plate at 160° and 170° C., and the times required for the resins to reach "string," "silk" and "cured" conditions were noted. The results of the tests were as follows:

|        | Example 4 |          | Example 5 |          |
|--------|-----------|----------|-----------|----------|
|        | at 160° C. | at 170° C. | at 160° C. | at 170° C. |
|        | Time (seconds) | | Time (seconds) | |
| String | 9  | 7  | 14 | 11 |
| Silk   | 18 | 15 | 29 | 25 |
| Cure   | 31 | 20 | 65 | 36 |

*Examples 6 and 7.*—Two reaction mixtures were made up as follows:

|                      | Example 6 | Example 7 |
|----------------------|-----------|-----------|
| Phenol               | 225       | 225       |
| Carbolic oil hiflash | 142       |           |
| Drip oil hiflash     |           | 165.5     |
| 37% formaldehyde     | 203       | 203       |
| Sulfuric acid (20%)  | 11.4      | 11.4      |

The carbolic oil hiflash was a coke oven tar distillate boiling within the range of 152° to 203° C. and contained about 53% by weight of polymerizable compounds, chiefly indene and coumarone. The drip oil hiflash boiled within the range of 160.5° to 205° C. and contained 45.3% of polymerizable compounds, chiefly indene. The reaction mixtures were reacted for 1½ hours at 96° C. and then vacuum distilled under absolute pressure of 4" of mercury until the temperature of the resin rose to 144° and 141° C., respectively. 305 parts of thermosetting resin of C5 color and 131° C. melting point were recovered in Example 6 and 316 parts of thermoplastic resin of C11 color and 135° C. melting point were recovered in Example 7.

Carbolic oil hiflash similar to that employed in Example 6 was fractionated to obtain a cut boiling at from 169° to 179° C. which contained about 45% of polymerizable material, largely coumarone, and another cut boiling at 179° to 183° C. which contained about 72% of polymerizable material, largely indene. Resins made in accordance with the foregoing examples, employing these cuts as the source of coumarone and indene, resulted in first-stage thermoplastic resins resembling those of the examples.

*Example 8.*—300 parts of phenol, 270 parts of 37% aqueous formaldehyde solution, 72 parts of carbolic oil fraction boiling within the range of 175° to 185° C. (containing 50 parts of polymerizable material, chiefly indene), and 250 parts of a drip oil fraction boiling within the range of 130° to 160° C. (containing 50 parts of styrene), were charged into a reaction vessel and heated to about 90° C. 22.8 parts of sulfuric acid polymerization catalyst of 20% concentration were added to the vessel, after which the temperature of the mixture rose to 95° to 100° C. and was maintained within this range for 1 hour. The reaction mixture was then subjected to distillation under vacuum to recover the resinous reaction product as residue. This resin produced molded products similar to those produced by the resins of the preceding examples when compounded and cured, as set forth in the examples, and had the advantage of curing substantially more rapidly than the resins of the other examples.

Thus, it will be seen the invention provides for the production of novel resins by reacting together polymerizable materials of the coumarone-indene type, phenol and formaldehyde. The resins are admirably adapted for molding under heat and pressure to form molded articles and are also suitable for use in laminating fibrous material such as paper and textile fabrics. Since the rate of cure of the resins may be varied by varying the proportions of phenol and polymerizable material, it is possible to make resins for different purposes requiring different rates of cure. Owing to the fact that coumarone-indene type polymerizable materials are considerably less costly than phenol, the resins of the invention are less expensive to manufacture than phenol-formaldehyde resins.

The resin melting points given herein were determined by the cube-in-mercury method described in "Protective and Decorative Coatings," vol. 1, pages 366–367, by J. J. Matiello, copyright 1941, published by John A. Wiley & Sons, Inc., New York, New York. Resin colors were determined by the "C" color scale disclosed in Cline United States Patent No. 2,344,676 of March 21, 1944.

Since certain changes may be made without departing from the scope of the invention, it is intended that the above description shall be interpreted as illustrative and not in a limiting sense.

We claim:

1. A process for producing thermoplastic resins which comprises heating together at a temperature between 65° and 102° C. an oil containing as its major polymerizable constituent at least one polymerizable material of the group consisting of coumarone, indene and their homologs boiling below 210° C.; a phenolic reagent of the group consisting of phenol, mixtures thereof with minor proportions of cresols and mixtures thereof with minor proportions of xylenols; and 0.70 to 0.95 mol of formaldehyde for each mol of phenolic reagent and total polymerizable material, in the presence of an acid catalyst of the group consisting of sulfuric acid, phosphoric acid and hydrochloric acid, the weight of total polymerizable material being equal to not less than 10% nor more than 100% of the weight of said phenolic reagent in the mixture.

2. A process as defined in claim 1 in which the catalyst is sulfuric acid.

3. A process as defined in claim 1 in which the oil contains indene and styrene in amount less than the indene.

4. A process as defined in claim 1 in which the oil contains indene and styrene in amount less than the indene and the catalyst is sulfuric acid.

5. A process as defined in claim 1 in which the reaction mixture is fractionally distilled to remove volatile oils, yielding as distillation residue a thermoplastic resin.

6. A process as defined in claim 5 in which the catalyst is sulfuric acid.

7. A process as defined in claim 6 in which the polymerizable material is composed substantially entirely of indene and styrene in amount less than the indene.

8. A process as defined in claim 7 in which the formaldehyde is present in amount equal to 0.8 to 0.9 mol for each mol of total polymerizable material.

9. A process as defined in claim 8 in which the heating is effected to raise the temperature to about 90° C. before the sulfuric acid catalyst is added and the temperature is thereafter raised to within the range 95°–100° C.

10. A thermoplastic resinous acid copolymerization product obtained by the process of claim 9.

11. A molding powder comprising a comminuted inert filler, hexamethylene tetramine, lime and a thermoplastic resinous acid copolymerization product obtained by the process of claim 10.

12. A thermoplastic resinous acid copolymerization product obtained by the process of claim 1.

13. A molding powder comprising a comminuted inert filler, hexamethylene tetramine, lime and a thermoplastic resinous acid copolymerization product obtained by the process of claim 1.

HARRY L. ALLEN.
EARL G. KERR.

REFERENCES CITED

The following references are of record in the file of this patent:

UNITED STATES PATENTS

| Number | Name | Date |
| --- | --- | --- |
| 1,616,321 | Kessler | Feb. 1, 1927 |
| 2,050,188 | Lee et al. | Aug. 4, 1936 |
| 2,101,853 | Harvey | Dec. 14, 1937 |
| 2,114,121 | Bender | Apr. 12, 1938 |
| 2,198,318 | Sachanen et al. | Apr. 23, 1940 |